UNITED STATES PATENT OFFICE.

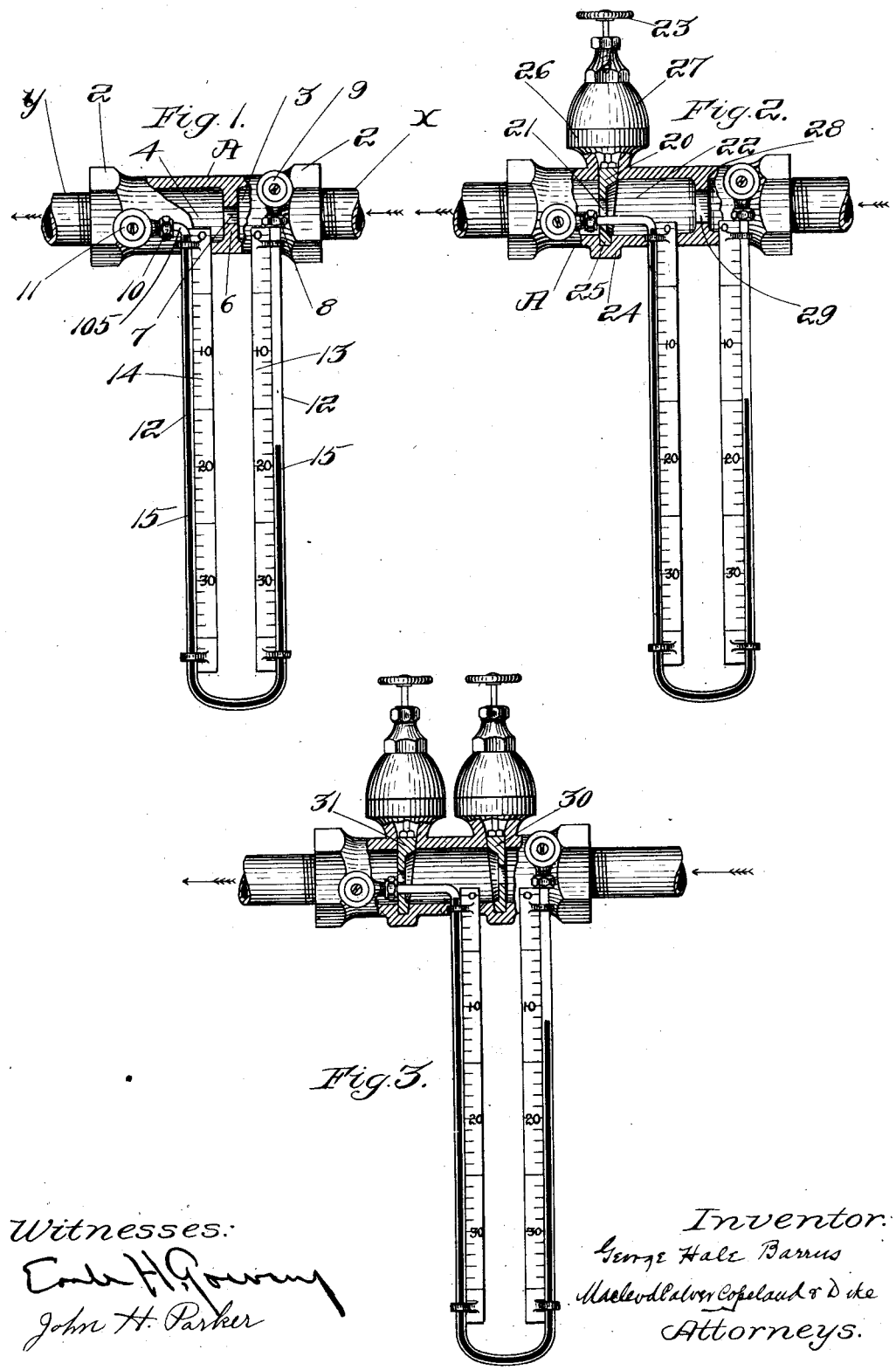

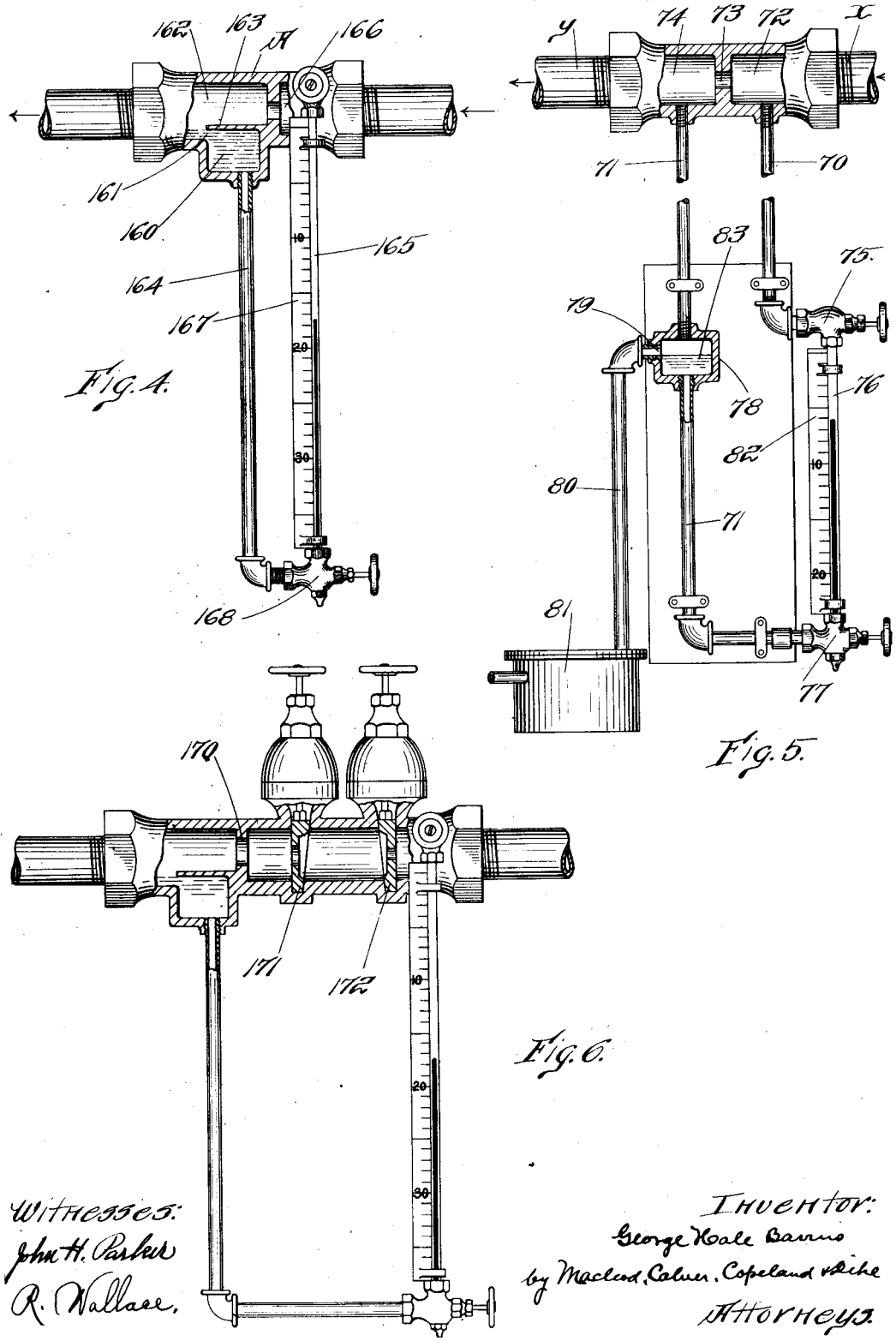

GEORGE HALE BARRUS, OF BROOKLINE, MASSACHUSETTS.

METER FOR STEAM, AIR, OR OTHER GASES.

1,047,911.  Specification of Letters Patent.  Patented Dec. 24, 1912.

Application filed September 18, 1909. Serial No. 518,367.

*To all whom it may concern:*

Be it known that I, GEORGE HALE BARRUS, a citizen of the United States, residing at Brookline, county of Norfolk, State of Massachusetts, have invented a certain new and useful Improvement in Meters for Steam, Air, or other Gases, of which the following is a specification, reference being had therein to the accompanying drawings.

My invention relates to improvements in meters for steam, air or other gases under pressure.

The nature and objects of the invention will be fully understood from the following description taken in connection with the accompanying drawings, and the novel features thereof are pointed out and clearly defined in the claims at the close of the specification.

In the accompanying drawings,—Figure 1 is a front view, partly broken away, of an apparatus embodying my invention. Figs. 2, 3 and 4 are similar views showing modified forms hereinafter referred to. Fig. 5 is a front view, partially in section, showing my invention embodied in an apparatus in which the pressure indicating tube and graduated scale are arranged to be located, if desired, at a point distant from but at a lower level than the gas supply pipe. Fig. 6 is a form of apparatus embodying my invention and being supplied with a fixed diaphragm and two removable diaphragms.

I will first describe my invention as shown in Fig. 1 which I consider the simplest although not the most desirable or efficient embodiment thereof.

The device comprises a body portion A having ends 2 shaped to receive a wrench for convenience in connecting up the body A in a pipe, such as X, Y. These ends are interiorly threaded, so that they may be screwed on to the threaded ends X, Y. The body A is preferably tubular, having a passage therethrough which is partially closed by means of a partition or diaphragm 6 having a restricted opening 7 therein. The passage through the body A is, therefore, divided by the diaphragm into two parts or chambers 3 and 4. By restricted opening I mean one less in area than the cross-sectional area of the passage or chamber on either side of the said diaphragm 6. A gage glass fitting 8, preferably having a shut-off cock 9, is secured in the usual way in the body A at one side of the diaphragm 6, so as to communicate with the passage or chamber 3 at one side of the said diaphragm 6. A similar fitting 10, having a shut-off cock 11, is provided at the other side of the said diaphragm 6 and connects with the chamber 4 on that side of the said diaphragm. The fittings 8 and 10 are provided with a U-shaped manometer tube 12 of transparent material, preferably glass, which is suitably supported and secured in place in any well-known manner, and the two parallel branches of which are provided with graduated scales 13 and 14 suitably mounted and secured in proximity to the branches 12 of the U-shaped tube, so that the position of the top of the column of liquid in each of the branches of the U-shaped tube may be determined by means of the graduations on the scales as is done in thermometers and like instruments. The liquid, which I employ in the tube 12, is water. This is indicated by the heavy black line 15. The water used is supplied, when steam is measured, by the condensation of the steam, and any excess will pass out of the tube 12 at that end thereof which is subjected to the lowest pressure, and will pass off with the steam. When air or other gas is to be measured, water is supplied to the tube from a suitable source of supply by means of a pump or equivalent device as hereinafter more fully set forth.

The effect of interposing a diaphragm, having a restricted opening therein, in a passage through which steam or gas under pressure is passing, is to throttle the flow, diminishing the volume which can pass through at a given pressure and causing a difference in pressure at the opposite sides of the diaphragm. This difference in pressure affords a means of measuring the steam or gas passing. The insertion, however, of a diaphragm with a restricted orifice of relatively small size in the path of flow of the fluid to be measured I find to be objectionable, especially in the case of steam, because it reduces the pressure to a material extent and such a reduction cannot in many cases be allowed. I am enabled, however, in the use of my present invention to avoid this objection by employing a restricted orifice of so large a size relatively, as to cause so small a difference in pressure that the reduction is not objectionable. I am enabled to do this by using water in the pressure indicating tube because a difference in pressure so slight as to be unobjectionable in the steam or gas supply will produce a very noticeable difference of level in the columns of water in the two legs or branches of the pressure indicating tube 12. I am, therefore, enabled to use a restricted orifice as a means of measurement and to obtain a wide range of readings without interfering to an objectionable degree with the pressure of the steam or gas supply.

The employment of water in the tube 12 renders necessary the use of a relatively long tube as will be obvious. Since the level of the water in the left hand branch or leg (Fig. 1) of the manometer tube 12 is liable to vary with variations in the rate of flow of the steam or gas, it is necessary, in the form of my device shown in Fig. 1, to employ two graduated scales 13 and 14, one for each branch of the tube 12, as previously stated, in order that the difference in level of the liquid in the two branches of the said tube may be accurately noted.

In order that the zero point on the scale 14 of the low pressure branch or leg 12 of the manometer tube may be located at the top of the level of the liquid in said tube and may be in a position to be seen, the tube is bent as shown at 105, in said Fig. 1, and enters the fitting 10 horizontally, the said fitting 10 being also horizontally placed. In this way the top of the level of the liquid in the tube 12 is observable and is on a level with the discharge opening of said tube into the chamber 4. If the opening of the fitting 10 into the chamber 4 was above the transparent tube 12 the level of the liquid at the zero point would not be observable.

By referring the difference in pressure on opposite sides of the diaphragm 6 as indicated by the liquid in the manometer tube to appropriate tables giving the results of calibration tests of the orifice or orifices employed, the amount of steam or gas passing through under the observed conditions are at once determinable. The graduations employed on the scales 13, 14, may be varied in accordance with the uses to which the meter is put. If it is employed for measuring steam, which is usually reckoned in terms of weight of steam used per hour or in horse power, the scale may be graduated in units of pounds weight per hour or of horse power. This is a matter of convenience merely, since in selling steam to a purchaser it is usually reckoned in H. P.

My device is simple in operation. The steam or other gas passes through the apparatus in the direction indicated by the arrows in the pipes X, Y. The pressure at the right hand side of the diaphragm will be greater than that at the left hand side, and this difference in pressure will force the column of water in the tube 12 at the right of the diaphragm 6 downwardly, so that the top thereof will be below the level of the top of the column of water in the leg or branch of the tube at the left of the diaphragm 6 which is open to the chamber on the low pressure side of the diaphragm. In the case of steam, the scale is so graduated that this difference in the level of the water in the two branches of the tube will indicate in pounds weight per hour or in horse power the steam which is passing through the supply pipe in which the apparatus is placed.

I have thus far described what might be termed the simplest embodiment of my invention. I will now describe the modifications of this simplest form which are shown in the other figures of the accompanying drawings.

In Fig. 2 I have shown my device fitted with a movable diaphragm 20 having a restricted orifice 21. The removable diaphragm 20 is provided with mechanism by means of which it may be raised or lowered out of or into position in the chamber 22 in the body of the meter. Any well known mechanism may be employed for this purpose. I have shown mechanism such as is employed in gate-valves and which is operated by means of a hand-wheel 23. By turning this wheel, the diaphragm 20 may be raised or lowered. The body A of the meter in this form of my device is provided with a projecting boss 24 within which is formed a proper seat 25 for the diaphragm when it is in position in the chamber 22. The body A is also provided with a boss 26 to receive a suitable housing 27 for the operating mechanism connected to the hand-wheel 23 by means of which the diaphragm is raised or lowered. The removable diaphragm 20 may be employed in connection with a fixed diaphragm shown at 28 and having a relatively large orifice 29 as shown in said Fig. 2. By this arrangement, if the quantity of steam, air or other gas flowing through the meter does not show a sufficient difference of pressure with the orifice 29 in use, the removable diaphragm 20 with a smaller orifice may be put into place in the path of flow, causing a greater difference in the pressures and a wider range of movement of the liquid in the manometer tube.

As will be obvious, two or more removable diaphragms may be employed with or without a fixed diaphragm. In Fig. 3 I have shown two such removable diaphragms indicated at 30 and 31. These are arranged and operated in the same manner as the removable diaphragm shown in Fig. 2 and heretofore described. I am thus enabled to use an orifice of such size as to be appropriate with the range of the manometer. If the difference of pressure is insufficient, when the largest orifice is in use, it can be withdrawn and other smaller orifices substituted, one after another, until the desired manometer conditions are secured and the difference of pressure is sufficient to be clearly indicated.

In Fig. 6 there is shown a device containing a fixed diaphragm 170 and two removable diaphragms 171 and 172, the orifices in said removable diaphragms 171 and 172 being of smaller sizes than the orifice in the fixed diaphragm. These removable diaphragms may be removed or inserted to vary the size of the passage through the device as desired in the same manner as has been described in the preceding paragraph.

It may here be noted that the use of a removable diaphragm is advantageous in many cases because it permits the entire removal of the diaphragm and thus the more free flow of the steam or gas when readings are not being taken from the meter. In determining, for example, the amount of steam supplied, readings might be taken from the meter at two or three times only in the course of a day. When the readings were being taken, the removable diaphragm would be in position in the path of flow of the steam, and after the reading was taken, could be removed until the next reading was taken. In this way the flow of steam would not be interfered with by the diaphragm except slightly for a very short time and at relatively long intervals which I consider a substantial advantage in the use of this form of my device.

By the employment of the connecting tubes 70 and 71 the manometer may, as will be clear, be located at a distance from the steam supply pipe.

The device in the form shown in Fig. 5 is intended to be located below the steam pipe and to that end the discharge pipe 80 discharges into a receptacle such as 81.

Referring now to the pressure indicating device or manometer, the following modifications of the form shown in Fig. 1 are to be noted. The forms of my device shown in Fig. 1, and in Figs. 2 and 3, make no provision for a constant zero point, and this latter is desirable. I am enabled to obtain a practically constant zero point by providing a reservoir at the upper level of the liquid in the branch or leg of the manometer which is in connection with the chamber at the low pressure side of the diaphragm. Such a reservoir is shown at 160, Fig. 4, and is preferably formed as there shown in the body A of the meter. By placing this reservoir shown in Fig. 4 at the level of the supply pipe, the overflow will pass into the said pipe and the same will be true if the reservoir is at a higher level than the supply pipe. The chamber 160 is open as shown at 161 to the low pressure chamber 162. A top or cover 163 is preferably provided to said chamber 160 in order to prevent any disturbance of the contents of the chamber by passing steam. The branch 164 of the manometer is connected, as will be clear from said Fig. 4, with the bottom of the reservoir 160. By the employment of this reservoir extreme changes of height in the branch 165 of the manometer tube, that is the branch connected with the high pressure chamber, will distribute the liquid over the relatively large area of the reservoir without materially affecting its height. For example, if the bore of the tube 165 is one-fourth of an inch in diameter and the chamber 160 is four inches in diameter, the areas are in the proportion of 1 to 256, and a movement of say 20 inches in the tube will cause a change of less than one-twelfth of an inch in the level in the reservoir. By placing the zero point of the scale 167 attached to the tube 165 on a level with the substantially unchangeable surface of the water in the reservoir 160 the difference in the level of the two legs of the manometer will be indicated on the single scale 167. As a result, the tube 164 which forms the low pressure branch or leg of the manometer may be a metal tube, the lower end thereof being provided with a gage glass fitting 168 of usual construction to receive the lower end of the transparent tube 165, which latter may be simply a straight tube. The employment of a straight tube is advantageous for various reasons. It is less expensive and in case of breakage such a tube may be easily replaced.

While in Fig. 4 above described, the reservoir 160 is shown as incorporated in the body of the meter it is not essential that it should be thus placed. It may be located at any point where for convenience it may be desirable to place the manometer. In Fig. 5 I have shown an arrangement which provides for the placing of the manometer at any desired point below the level of the supply pipe X Y. To this end two tubes 70 and 71 are employed, the tube 70 being connected with the chamber 72 at the high pressure side of the diaphragm 73 and the tube 71 with the chamber 74 at the low pressure side of the said diaphragm. The lower end of the tube 70 is provided with a gage glass fitting 75 to receive the upper end of the manometer tube 76. The lower end of said tube is connected with another gage glass fitting 77 which in turn is connected with the lower end of the tube 71. In the tube 71 I insert a chamber or reservoir 78 which is provided with an overflow opening 79 connected by means of the pipe 80 with a trap or other receptacle 81 for the overflow from the said chamber 78. The zero of the scale 82 which is secured to the transparent tube 76 of the manometer is set at the level 83 of the water in the said reservoir or chamber 78. As will be obvious the operation of this pressure indicating apparatus is substantially the same as is that of the form shown in Fig. 4 except that the overflow in the form shown in Fig. 4 passes off with the steam in the supply pipe, whereas the overflow in the form shown in said Fig. 5 passes off into a trap or receptacle provided for the purpose.

What I claim is:

1. A meter for steam comprising a chamber through which the steam to be measured passes, a diaphragm in said chamber having an orifice therein and a U-tube manometer containing a column of water in each leg supplied by condensation, the column of water in the low pressure leg being an unbroken continuation of the column of water in the high pressure leg, the ends of said manometer being connected with the chamber through which the steam passes at opposite sides of the diaphragm.

2. A meter for steam comprising a chamber through which the steam to be measured passes, a diaphragm in said chamber having an orifice therein, a U-tube manometer containing a column of water in each leg supplied by condensation, the column of water in the low pressure leg being an unbroken continuation of the column of water in the high pressure leg, the ends of said manometer being connected with the chamber through which the steam passes at opposite sides of the diaphragm and a reservoir between the said chamber and the low pressure end of the manometer.

In testimony whereof I affix my signature, in presence of two witnesses.

GEORGE HALE BARRUS.

Witnesses:
  WILLIAM A. MACLEOD,
  ALICE H. MORRISON.